US011057110B2

(12) United States Patent
Abe

(10) Patent No.: US 11,057,110 B2
(45) Date of Patent: Jul. 6, 2021

(54) OPTICAL TRANSMISSION DEVICE AND OPTICAL TRANSMISSION METHOD

(71) Applicant: NEC Corporation, Tokyo (JP)

(72) Inventor: Ryota Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/755,959

(22) PCT Filed: Oct. 23, 2018

(86) PCT No.: PCT/JP2018/039255
§ 371 (c)(1),
(2) Date: Apr. 14, 2020

(87) PCT Pub. No.: WO2019/082862
PCT Pub. Date: May 2, 2019

(65) Prior Publication Data
US 2020/0266912 A1 Aug. 20, 2020

(30) Foreign Application Priority Data

Oct. 26, 2017 (JP) .............................. JP2017-207102

(51) Int. Cl.
*H04B 10/293* (2013.01)
*H04J 14/02* (2006.01)
*H04B 10/077* (2013.01)

(52) U.S. Cl.
CPC ......... *H04B 10/293* (2013.01); *H04B 10/077* (2013.01); *H04J 14/0227* (2013.01); *H04B 2210/078* (2013.01)

(58) Field of Classification Search
CPC ...... H04B 10/29–299; H04B 2210/078; H04B 10/293; H04B 10/077; H04J 14/0227
See application file for complete search history.

(56) References Cited

U.S. PATENT DOCUMENTS 5,600,466 A 2/1997 Tsushima et al.
5,864,414 A 1/1999 Barnsley et al.
(Continued)

FOREIGN PATENT DOCUMENTS

EP 0812078 A2 12/1997
EP 3125445 A1 2/2017
(Continued)

OTHER PUBLICATIONS

International Search Report corresponding to PCT/JP2018/039255 dated Dec. 25, 2018 (one page).
(Continued)

*Primary Examiner* — Casey L Kretzer

(57) ABSTRACT

In order to improve reception sensitivity of a response signal at a terminal station, an optical transmission device includes a reception unit that receives a control signal including a predetermined instruction and a main signal, via an optical transmission path connected to the terminal station, a control unit that performs the predetermined instruction of the received control signal, an extraction unit that extracts light in a band of the control signal, a response signal generation unit that modulates the extracted light in the band of the control signal, and outputs a response signal, and a multiplexing unit that multiplexes and outputs the response signal and the main signal. The control unit controls modulation by the response signal generation unit according to the control signal.

20 Claims, 8 Drawing Sheets

(56) References Cited

U.S. PATENT DOCUMENTS

| | | | |
|---|---|---|---|
| 6,909,853 B1* | 6/2005 | Yamashita | H04B 10/077 398/177 |
| 2001/0038488 A1* | 11/2001 | Kinoshita | H04B 10/0777 359/341.41 |
| 2003/0011855 A1 | 1/2003 | Fujiwara | |
| 2003/0035184 A1 | 2/2003 | Deguchi et al. | |
| 2004/0114213 A1 | 6/2004 | Yamaguchi | |
| 2010/0134875 A1* | 6/2010 | Mori | H04B 10/2935 359/334 |
| 2015/0318926 A1* | 11/2015 | Zhang | H04B 10/298 398/183 |
| 2017/0126326 A1 | 5/2017 | Aida | |

FOREIGN PATENT DOCUMENTS

| | | |
|---|---|---|
| JP | H07-212347 A | 8/1995 |
| JP | 2001-223643 A | 8/2001 |
| JP | 2001-244885 A | 9/2001 |
| JP | 2004-064500 A | 2/2004 |
| JP | 2004-228761 A | 8/2004 |
| JP | 2005-136602 A | 5/2005 |
| WO | WO-1995/020847 A2 | 8/1995 |
| WO | WO-2015/145985 A1 | 10/2015 |

OTHER PUBLICATIONS

Written Opinion ISA 237 corresponding to PCT/JP2018/039255 dated Dec. 25, 2018 (6 pages).
Extended European Search Report for EP Application No. EP18870817.6 dated Nov. 18, 2020.

* cited by examiner

OPTICAL TRANSMISSION DEVICE AND OPTICAL TRANSMISSION METHOD

CROSS REFERENCE TO RELATED APPLICATIONS

This application is a national stage application of International Application No. PCT/JP2018/039255 entitled "Optical Transmission Device and Optical Transmission Method" filed on Oct. 23, 2018, which claims priority to Japanese Patent Application No. JP2017-207102 filed on Oct. 26, 2017, the disclosures of which are hereby incorporated by reference in their entirety.

TECHNICAL FIELD

The present invention relates to an optical transmission device and an optical transmission method, and particularly relates to an optical transmission device and an optical transmission method that output a response signal according to a received control signal.

BACKGROUND ART

In a submarine optical transmission system, control of a repeater installed on a sea bottom is performed from a terminal station on land. FIG. 8 is a block diagram illustrating a configuration of a general submarine optical transmission system 900. The submarine optical transmission system 900 includes terminal stations 910, 920, and 930 located on land, a submarine repeater 940, and a submarine splitting device 950.

The submarine repeater 940 receives an optical signal acquired by wavelength-multiplexing a control signal S0 and main signals S2 and S3 from the terminal station 910. The control signal S0 and the main signals S2 and S3 have wavelength bands different from one another. In FIG. 8, spectra of the control signal S0 and the main signals S2 to S4 of each unit on a transmission path are also illustrated in a diagram with a vertical axis as amplitude and a horizontal axis as wavelength. The control signal S0 is a signal for controlling the submarine repeater 940. The main signal S2 is a signal sent from the terminal station 910 to the terminal station 920. The main signal S3 is a signal sent from the terminal station 910 to the terminal station 930. Hereinafter, a wavelength-multiplexed signal is described as a wavelength division multiplexed (WDM) signal.

The submarine repeater 940 includes an optical coupler 941, an optical receiver 942, a control unit 943, a drive unit 944, a laser diode (LD) 945, and an optical amplifier 946. The optical coupler 941 splits the control signal S0 and the main signals S2 and S3, and outputs the control signal S0 and the main signals S2 and S3 to the optical receiver 942 and the optical amplifier 946. The optical receiver 942 performs optical-electrical (O/E) conversion on the control signal S0. The control unit 943 processes the control signal, and generates a response signal, based on a processing result. The optical amplifier 946 amplifies the control signal S0 and the main signals S2 and S3 split by the optical coupler 941. The LD 945 generates excitation light of the optical amplifier 946.

The drive unit 944 modulates an amplitude of a drive current of the LD 945, based on the response signal generated by the control unit 943. In this way, a WDM signal including the control signal S0 and the main signals S2 and S3 input to the optical amplifier 946 is subjected to the amplitude modulation. A black region in the diagram indicating the spectrum of each of the signals in FIG. 8 schematically indicates the amplitude modulation of the WDM signal.

The submarine splitting device 950 includes optical couplers 951 and 953 and an optical filter (FIL) 952. The optical coupler 951 splits the WDM signal output from the optical amplifier 946 of the submarine repeater 940, and outputs the WDM signals to the terminal station 930 and the optical filter 952. The terminal station 930 selects the main signal S3 being a signal addressed to the terminal station 930 from the received control signal S0 and the received main signals S2 and S3, and demodulates the main signal S3. The terminal station 930 sends a main signal S4 addressed to the terminal station 920. The main signal S4 is a signal having the same wavelength band as that of the main signal S3.

The optical filter 952 blocks a wavelength range of the main signal S3. The optical coupler 953 outputs, to the terminal station 920, the WDM signal acquired by combining the control signal S0 and the main signal S2 that are transmitted from the terminal station 910 with the main signal S4 transmitted from the terminal station 930. As a result, the terminal station 920 can receive the main signals S2 and S4, and can also extract the response signal generated by the control unit 943 from an amplitude change in the control signal S0 and the main signal S2.

In relation to the present invention, PTL 1 describes a configuration in which a Raman amplification relay device generates a response signal with respect to a control signal, and sends the response signal to another terminal station. PTLs 2 and 3 describe a technique for monitoring an optical repeater by using monitoring signal light.

CITATION LIST

Patent Literature

[PTL 1] Japanese Unexamined Patent Application Publication No. 2004-228761
[PTL 2] Japanese Unexamined Patent Application Publication No. 2005-136602
[PTL 3] Japanese Unexamined Patent Application Publication No. 2001-223643

SUMMARY OF INVENTION

Technical Problem

The drive unit 944 controls excitation light power of the optical amplifier 946 by causing a fluctuation in drive current of the LD 945 by a response signal. As a result, the response signal is superimposed on light output power of the optical amplifier 946. At this time, an amplitude of the optical signal (S0, S2, and S3) included in the whole band that passes through the optical amplifier 946 is modulated based on the response signal. Therefore, when a modulation degree of the response signal is increased by increasing an amount of fluctuation in drive current of the LD 945, a transmission characteristic deteriorates due to an increase in amplitude fluctuation of the main signal, and thus the modulation degree of the response signal cannot be increased much. On the other hand, when the WDM signal output from the submarine repeater 940 passes through the submarine splitting device 950 and is transmitted to the terminal station 920, the main signal S3 is blocked by the optical filter 952, and the main signal S4 that does not include a component of the response signal is multiplexed by the optical coupler 953. Thus, when the signal multiplexed by the optical coupler 953 is received by the terminal station 920, the modulation degree of the response signal decreases during demodulation of the response signal based on the WDM signal received by the terminal station 920.

In other words, a general submarine optical transmission system has a problem that it is difficult to increase a modulation degree of a response signal generated by a submarine repeater, and, as a result, it is difficult to improve reception sensitivity of the response signal at a terminal station.

Object of Invention

An object of the present invention is to provide an optical transmission device and an optical transmission method, being capable of generating a response signal that can suppress a decrease in reception sensitivity during reception of the response signal.

Solution to Problem

An optical transmission device according to the present invention includes:

a reception means for receiving a control signal including a predetermined instruction and a main signal, via an optical transmission path connected to a terminal station;

a control means for performing the predetermined instruction of the received control signal;

an extraction means for extracting light in a band of the control signal;

a response signal generation means for modulating the extracted light in the band of the control signal, and outputting a response signal;

and a multiplexing means for multiplexing and outputting the response signal and the main signal, wherein the control means controls modulation by the response signal generation means according to the control signal.

An optical transmission method according to the present invention includes:

receiving a control signal including a predetermined instruction and a main signal, via an optical transmission path connected to a terminal station;

performing the predetermined instruction of the received control signal;

extracting light in a band of the control signal;

modulating the extracted light in the band of the control signal according to the control signal, and outputting a response signal; and multiplexing and outputting the response signal and the main signal.

Advantageous Effects of Invention

The optical transmission device and the optical transmission method according to the present invention can generate a response signal capable of suppressing a decrease in reception sensitivity during reception of the response signal.

EXAMPLE EMBODIMENT

Example embodiments according to the present invention will be described below. An arrow in a block diagram for describing the example embodiments exemplifies an orientation of a signal for description, and does not limit the orientation of the signal. Further, a component that has already been described is provided with the same reference sign, and the repeated description thereof is omitted.

First Example Embodiment

Figure 1:
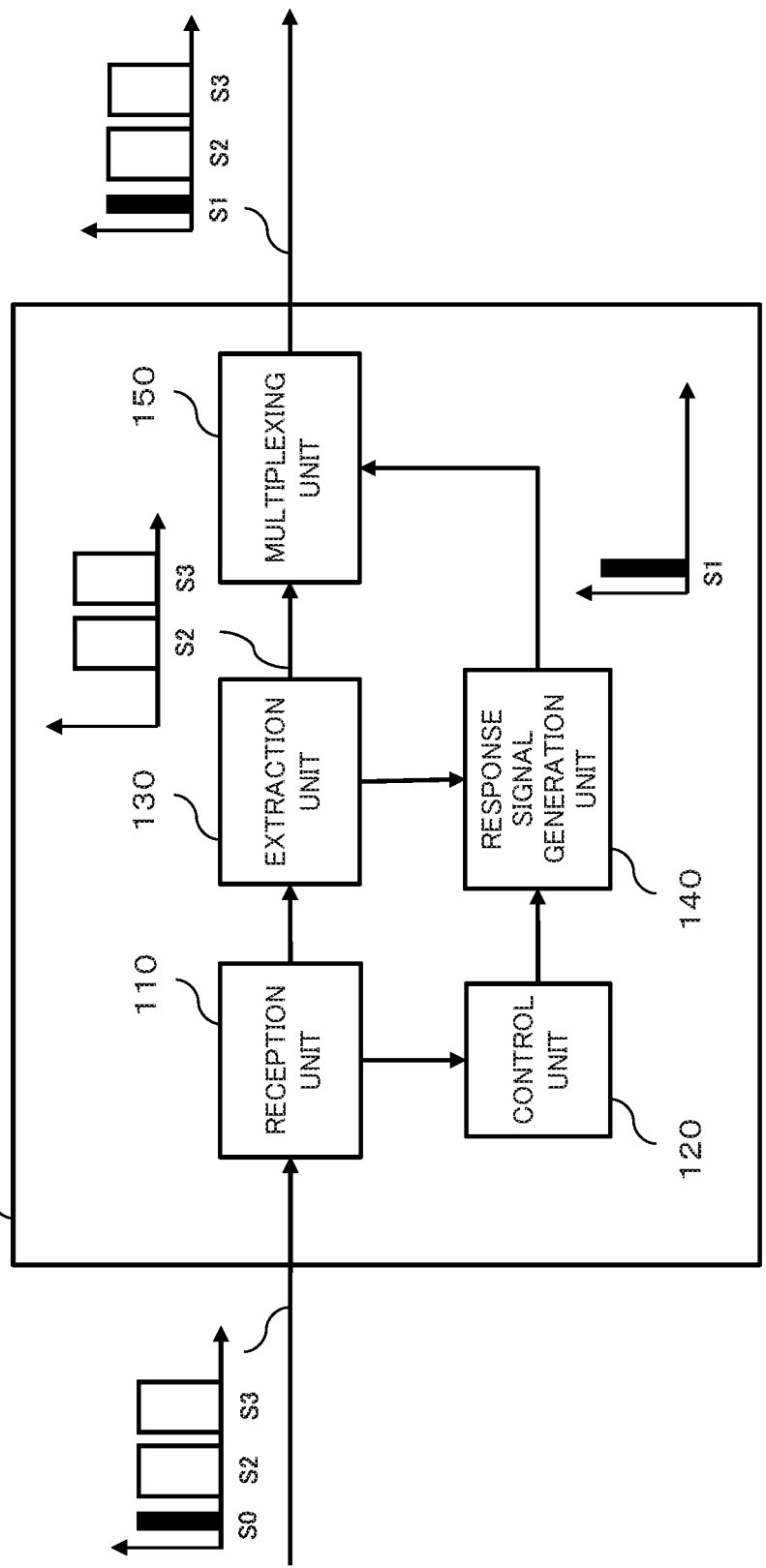
FIG. 1 is a block diagram illustrating a configuration example of an optical transmission device 100 according to a first example embodiment.

FIG. 1 is a block diagram illustrating a configuration example of an optical transmission device 100 according to a first example embodiment of the present invention. The optical transmission device 100 receives a WDM signal including a control signal S0, a main signal S2, and a main signal S3 from an optical transmission path, and outputs a WDM signal including a response signal S1 and the main signals S2 and S3 to the optical transmission path. The optical transmission device 100 includes a reception unit 110, a control unit 120, an extraction unit 130, a response signal generation unit 140, and a multiplexing unit 150. Note that a wavelength band of the control signal S0 may be a dedicated wavelength band different from that of a main signal system, or may be a wavelength band that is not used among wavelength bands of the main signal system.

The reception unit 110 serves as a reception means for receiving the control signal S0 including a predetermined instruction and the main signals S2 and S3 via the optical transmission path connected to a terminal station. The control unit 120 serves as a control means for performing the predetermined instruction included in the received control signal S0. The extraction unit 130 serves as an extraction means for extracting light in a wavelength band of the control signal S0, and outputting the light to the response signal generation unit 140. The response signal generation unit serves as a response signal generation means for modulating the extracted light in the band of the control signal S0, and outputting the light as the response signal S1. The multiplexing unit 150 serves as a multiplexing means for multiplexing and outputting the response signal S1 and the main signals S2 and S3. Herein, the control unit 120 controls modulation by the response signal generation unit 140 according to the control signal S0.

Note that, in block diagrams in the present example embodiment and the subsequent example embodiment, spectra of the control signal S0, the response signal S1, and the main signal of each unit are also illustrated in a diagram with a vertical axis as amplitude and a horizontal axis as wavelength. A black region of the spectra of the control signal S0 and the response signal S1 schematically indicates amplitude modulation.

Figure 2:
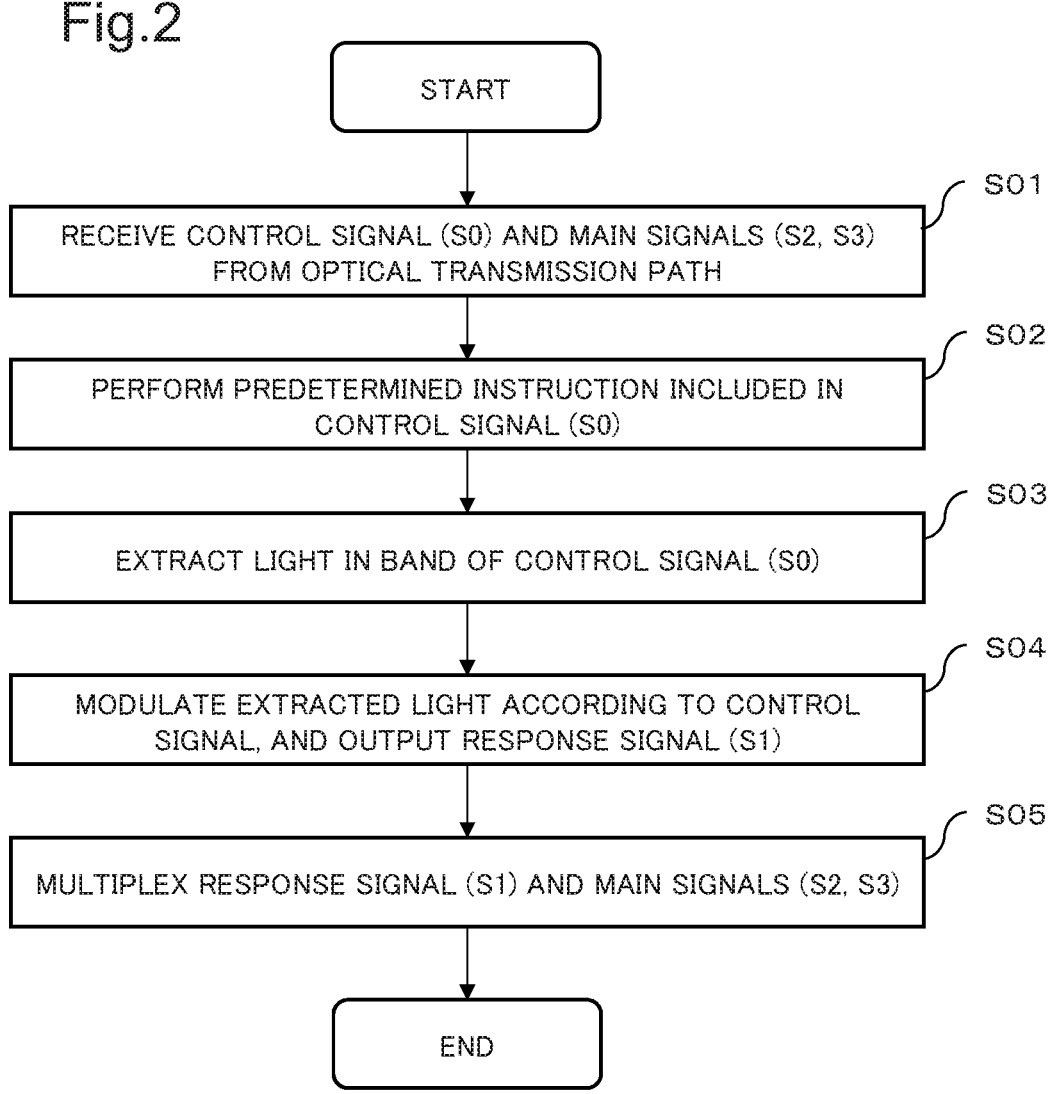
FIG. 2 is a flowchart illustrating an example of an operation procedure of the optical transmission device 100 according to the first example embodiment.

FIG. 2 is a flowchart illustrating an optical transmission method being an example of an operation procedure of the optical transmission device 100. The reception unit 110 receives the control signal S0 and the main signals S2 and S3 from the optical transmission path (step S01 in FIG. 2). The control unit 120 performs a predetermined instruction included in the control signal S0 (step S02). The extraction unit 130 extracts light in a wavelength band of the control signal S0 (step S03). The response signal generation unit 140 modulates the extracted light according to the control signal S0, and outputs the response signal S1 (step S04). The multiplexing unit 150 multiplexes the response signal S1 and the main signals S2 and S3 (step S05).

In the optical transmission device 100 having such a configuration, the response signal generation unit 140 performs modulation according to the control signal S0 only on a signal in a band being extracted by the extraction unit 130, and a response signal is not superimposed on the main signals S2 and S3. As a result, the optical transmission device 100 can generate the response signal capable of suppressing a decrease in reception sensitivity during reception of the response signal S1.

Second Example Embodiment

Figure 3:
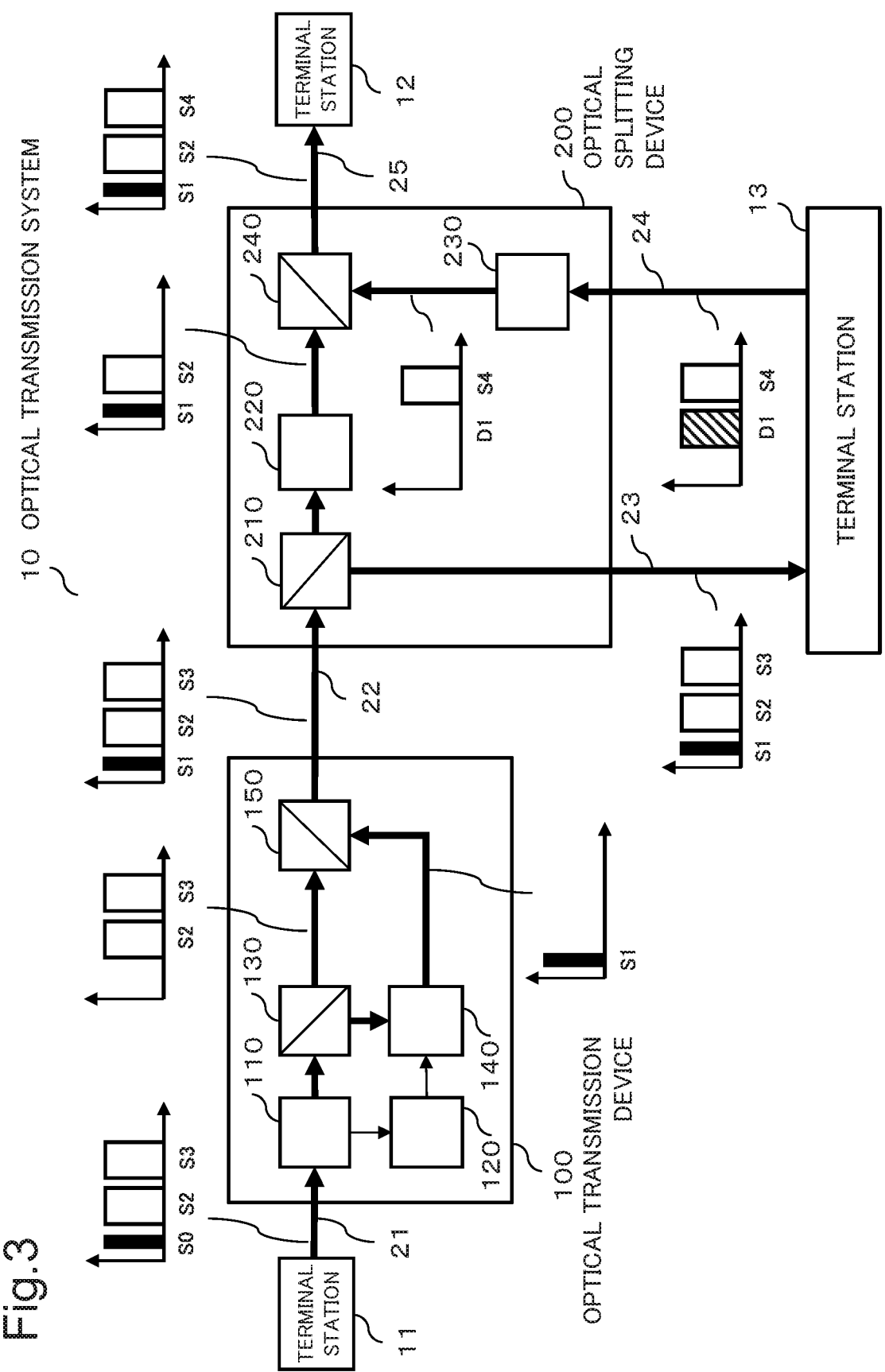
FIG. 3 is a block diagram illustrating a configuration example of an optical transmission system 10 according to a second example embodiment.

FIG. 3 is a block diagram illustrating a configuration example of an optical transmission system 10 according to a second example embodiment of the present invention. The optical transmission system 10 includes terminal stations 11 to 13, an optical transmission device 100, and an optical splitting device 200. An optical fiber cable is used as optical transmission paths 21 to 25. The terminal station 11 transmits a WDM signal including a control signal S0 and main signals S2 and S3 to the optical transmission device 100 by using the optical transmission path 21. The control signal S0 is a signal for controlling the optical transmission device 100, the main signal S2 is a signal addressed to the terminal station 12 from the terminal station 11, and the main signal S3 is a signal addressed to the terminal station 13 from the terminal station 11. The optical transmission system 10 includes the optical transmission device 100 described in the first example embodiment. The optical transmission device 100 outputs a WDM signal including a response signal S1 and the main signals S2 and S3 to the optical splitting device 200 by using the optical transmission path 22. A detailed configuration example of the optical transmission device 100 in the second example embodiment will be described later with reference to FIG. 4.

The optical splitting device 200 splits the WDM signal received from the optical transmission path 22 into directions to the terminal station 12 and the terminal station 13. The optical splitting device 200 is, for example, an optical add/drop multiplexer (OADM) device, and includes functions of splitting and combining a WDM signal. The optical splitting device 200 includes optical couplers 210 and 240 and optical filters 220 and 230. The optical splitting device 200 outputs a WDM signal including the main signal S3 to the terminal station 13, and outputs a WDM signal including the response signal S1, the main signal S2, and a main signal S4 to the terminal station 12. A detailed configuration example of the optical splitting device 200 will be described later with reference to FIG. 7.

The terminal station 13 selects the main signal S3 being a signal addressed to the terminal station 13 from the WDM signal received from the optical transmission path 23, and demodulates the main signal S3. Furthermore, the terminal station 13 sends a WDM signal that is addressed to the terminal station 12 and includes the main signal S4 and a dummy signal D1 to the optical splitting device 200 by using the optical transmission path 24. The main signal S4 is a signal in the same wavelength band as that of the main signal S3. The dummy signal D1 is an optical signal in a wavelength range different from that of the main signal S4, which is added for maintaining, in a predetermined range, input power of the WDM signal to an optical amplifier on the optical transmission path 24, and the dummy signal D1 does not include information that needs to be transmitted. Sending of the dummy signal D1 is not necessary.

The terminal station 12 demodulates the response signal S1 included in the WDM signal received from the optical transmission path 25, and confirms response data included in the response signal S1. The response data include information about a control result of the optical transmission device 100 by the control signal S0. Therefore, the terminal station 12 can confirm the control result of the optical transmission device 100 by the control signal S0.

Figure 4:
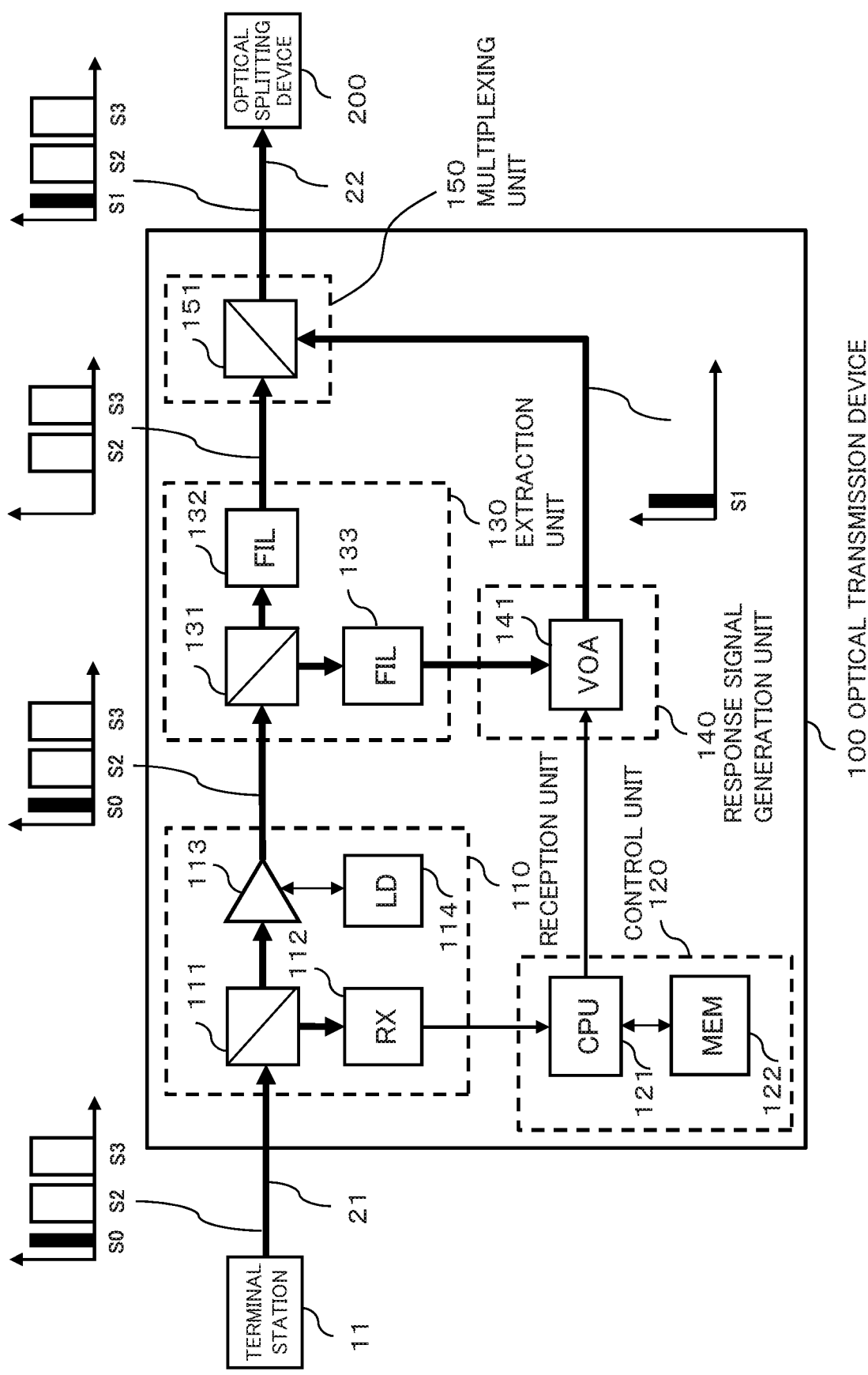
FIG. 4 is a block diagram illustrating a configuration example of an optical transmission device 100 according to the second example embodiment.

FIG. 4 is a block diagram illustrating a configuration example of the optical transmission device 100 according to the second example embodiment. The optical transmission device 100 includes a reception unit 110, a control unit 120, an extraction unit 130, a response signal generation unit 140, and a multiplexing unit 150, similarly to the first example embodiment. The optical transmission device 100 is an optical repeater that relays a received WDM signal. In the present example embodiment, a more detailed configuration of the optical transmission device 100 will be described.

The reception unit 110 includes an optical coupler 111, an optical receiver (RX) 112, an optical amplifier 113, and a drive circuit (LD) 114. The optical coupler 111 splits the WDM signal received from the optical transmission path 21, and outputs the WDM signals to the optical receiver 112 and the optical amplifier 113. The optical receiver 112 performs O/E conversion on the control signal S0 included in one of the split WDM signals, and outputs the control signal S0 to the control unit 120. The optical receiver 112 may include an optical filter that passes a wavelength including the control signal S0. Control data (for example, an instruction of a control content) are included in the control signal S0. The optical amplifier 113 is an optical fiber amplifier, and amplifies the WDM signal including the control signal S0 and the main signals S2 and S3 and outputs the WDM signal to the extraction unit 130. An excitation LD of the optical amplifier 113 and a control circuit of the excitation LD are included in the drive circuit 114. The control circuit of the excitation LD controls output power of the excitation LD in such a way that output power of the optical amplifier 113 falls within a constant range, for example.

The control unit 120 includes a central processing unit (CPU) 121 and a memory (MEM) 122. A function of the optical transmission device 100 may be achieved by executing a program stored in the memory 122 by the central processing unit 121 (computer). The memory 122 is a tangible and non-transitory recording medium, and is, for example, a semiconductor memory or a fixed magnetic disk device, which is not limited thereto.

The control unit 120 extracts control data from an electric signal acquired by performing the O/E conversion on the control signal S0, controls the optical transmission device 100, based on the control data, and generates response data.

The response data include an execution result (control result) of control of the optical transmission device 100, based on the control signal S0. The response data include, for example, information about a success or a failure of control and state information of each unit of the optical transmission device 100 being read based on control. The response data are output as an electric signal from the control unit 120 to the response signal generation unit 140. In the present example embodiment, the response data are expressed by ON/OFF of an electric signal. For example, the response data express a control result by combining one or more pieces of data of 8 bits.

The extraction unit 130 includes a coupler 131 and optical filters (FIL) 132 and 133. The coupler 131 splits, into two, the WDM signal that is output from the optical amplifier 113 and includes the control signal S0 and the main signals S2 and S3, and outputs the WDM signals to the optical filters 132 and 133. The optical filter 132 blocks light in a wavelength range of the control signal S0, and passes light in a wavelength range of the main signals S2 and S3. The optical filter 133 passes the light in the wavelength range of the control signal S0, and blocks the light in the wavelength range of the main signals S2 and S3. With such a configuration, the main signals S2 and S3 are output to the multiplexing unit 150, and the control signal S0 is output to the response signal generation unit 140. As the extraction unit 130, a wavelength filter that separates a wavelength range including the control signal S0 and a wavelength range including the main signals S2 and S3 may be used.

In the present example embodiment, a variable optical attenuator (VOA) 141 is used as the response signal generation unit 140. The variable optical attenuator 141 modulates an amplitude of light with a wavelength of the control signal S0, based on ON/OFF (namely, "0" and "1" of a bit string) of the response data received from the control unit 120. The variable optical attenuator 141 controls an amount of attenuation in such a way as to be maximum or minimum according to ON/OFF of the response data. By such control, the response data are transmitted according to ON/OFF of the light with the wavelength of the control signal S0. Hereinafter, the light with the wavelength of the control signal S0 modulated by the variable optical attenuator 141 is referred to as a response signal S1. In other words, the response signal S1 is an optical signal acquired by on-off keying modulation of the response data, the response data being a control result by the control signal S0. A modulation speed (namely, a width of a bit string) of the response data and a length of a bit string can be defined in a range in which the response signal S1 does not affect transmission of the main signals S2 to S4.

Figure 5:
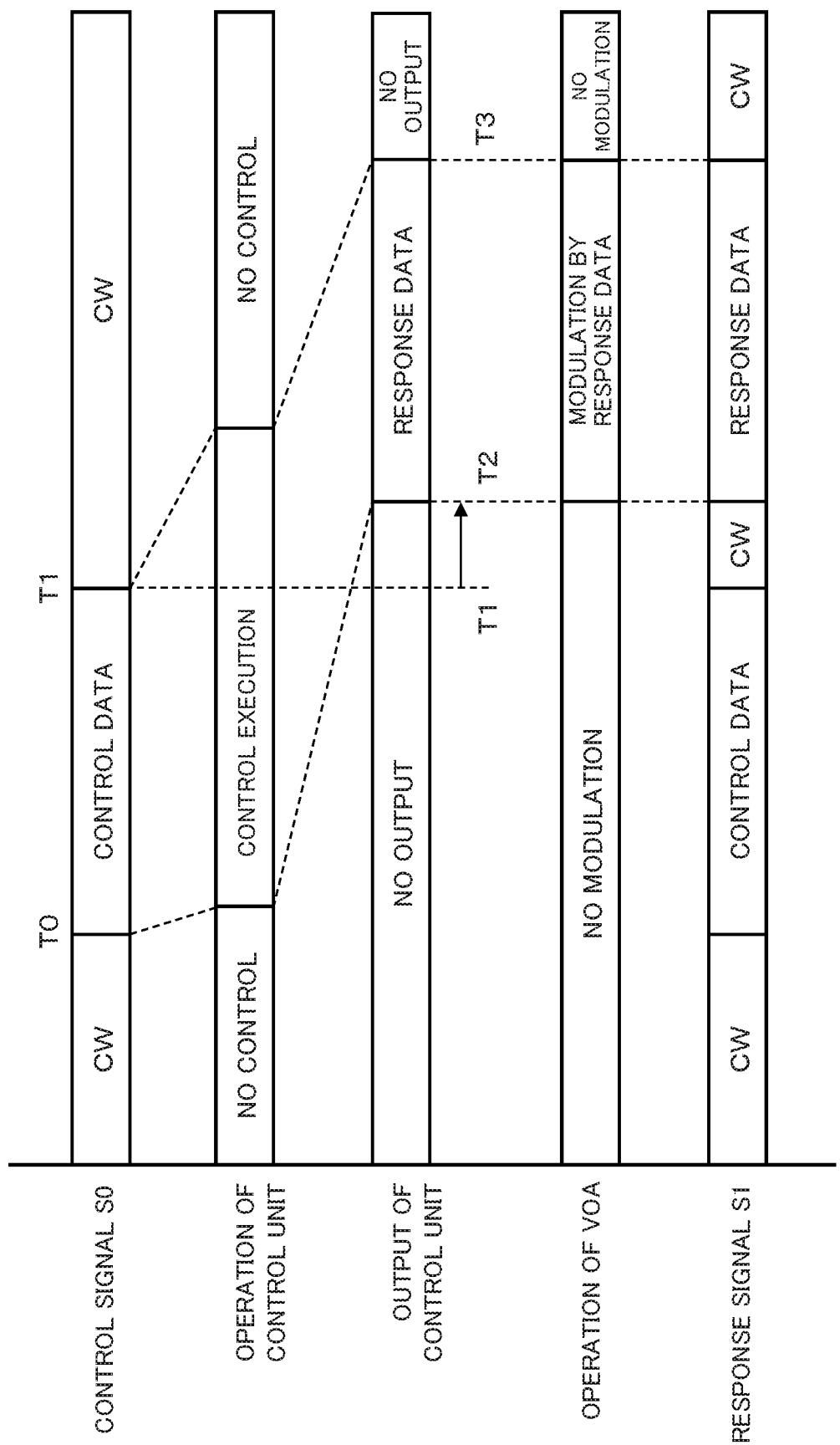
FIG. 5 is a diagram for describing an operation example of the optical transmission device 100 according to the second example embodiment.

FIG. 5 is a diagram for describing an operation example of the optical transmission device 100 according to the second example embodiment. A vertical direction indicates the control signal S0, the response signal S1, and an operation of each unit, and a horizontal axis indicates time. The control signal S0 received from the terminal station 11 is continuous wave (CW) light when there is no control from the terminal station 11. When sending of a signal including control data starts at a time T0, the control signal S0 is modulated by the control data. In this way, the control signal S0 is a burst signal. The sending of the control data by the control signal S0 continues until a time T1. When the sending of the control data is terminated at the time T1, the control signal S0 returns to CW light.

The control unit 120 performs control of the optical transmission device 100, based on the control data demodulated by the optical receiver 112, and also collects a control result from a control target. The control unit 120 waits for reception of the control data to be terminated at the time T1, and outputs a control result as response data to the response signal generation unit 140 at and after a time T2. The control unit 120 may hold the response data in the memory 122 until the time T2. Further, the control unit 120 may acquire information about whether the control signal S0 includes the control data from the reception unit 110.

When receiving the response data from the control unit 120, the variable optical attenuator 141 modulates, by the response data, the control signal S0 that has become the CW light, and generates the response signal S1. The response signal S1 is output to the multiplexing unit 150. The response signal S1 may be modulated in such a way as to be associated with an amplitude of the response data. For example, an amount of attenuation of the variable optical attenuator 141 may be set to minimum while a bit of the response data is "1", and an amount of attenuation of the variable optical attenuator 141 may be set to maximum while a bit of the response data is "0". Conversely, an amount of attenuation of the variable optical attenuator 141 may be set to maximum while a bit of the response data is "1", and an amount of attenuation of the variable optical attenuator 141 may be set to minimum while a bit of the response data is "0". Such a procedure of the modulation generates the response signal S1 acquired by modulating presence or absence of light according to ON/OFF of the response data.

When generation of the response data is terminated at a time T3, the modulation operation of the variable optical attenuator 141 is also terminated, and the response signal S1 returns to the CW light. Note that, when sending of the control signal S0 from the terminal station S11 starts during the generation of the response signal S1, the control unit 120 stops sending of the response data to the response signal generation unit 140. In this way, a collision between the response signal S1 and the control signal S0 in the response signal generation unit 140 can be avoided. Further, the modulation by the response data is not performed during the reception of the control data S0. During the reception of the control signal S0, the control data S0 may be output as the response signal S1 to the multiplexing unit 150 with an amount of attenuation of the variable optical attenuator 141 being set to minimum. Alternatively, the control data S0 may not be output to the multiplexing unit 150 with an amount of attenuation of the variable optical attenuator 141 being set to maximum.

Figure 6:
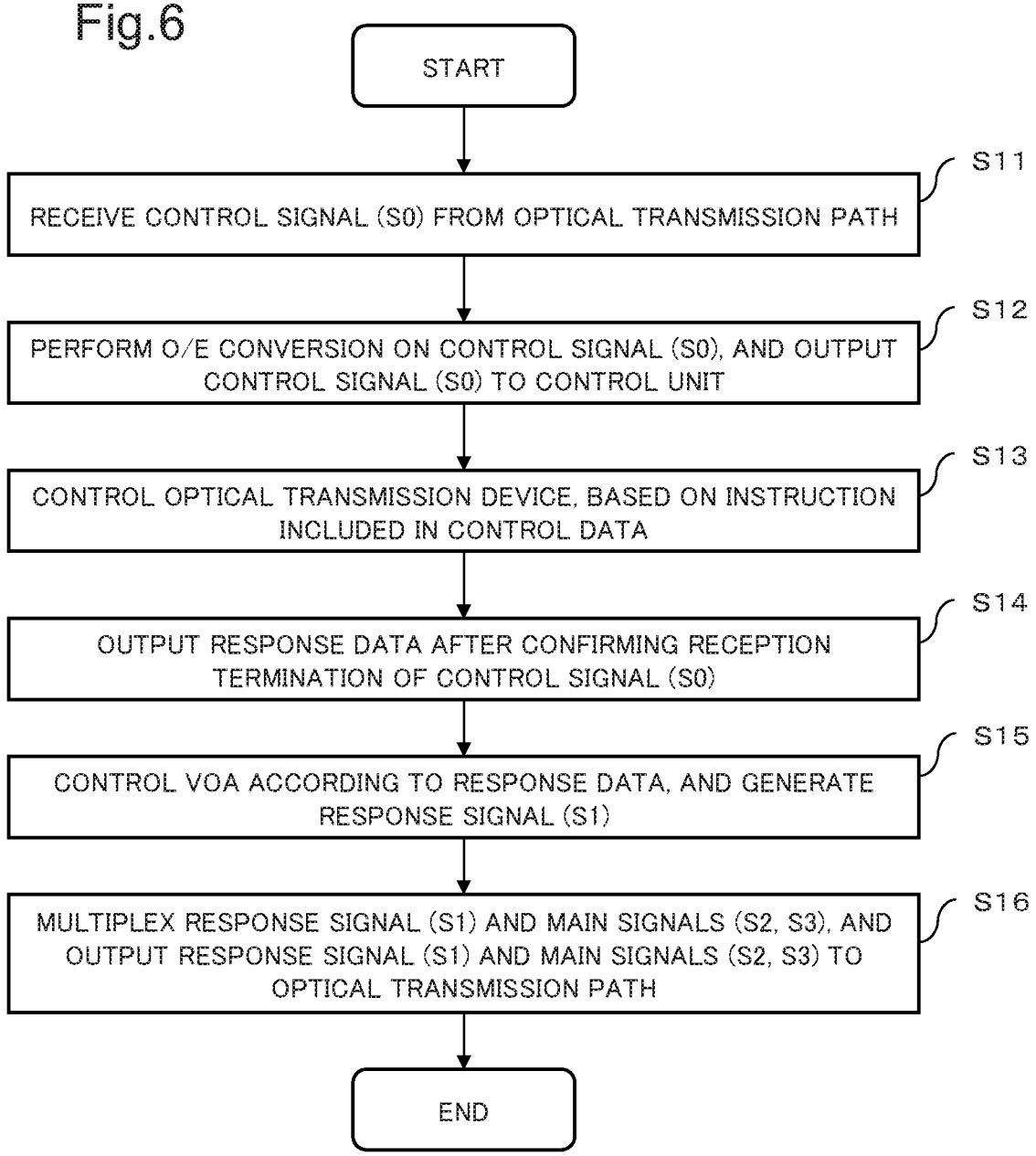
FIG. 6 is a flowchart illustrating an example of an operation procedure of the optical transmission device 100 according to the second example embodiment.

FIG. 6 is a flowchart illustrating an example of an operation procedure of the optical transmission device 100 according to the second example embodiment. The optical transmission device 100 receives the WDM signal including the control signal S0 from the optical transmission path 21, and outputs one of the WDM signals split by the optical coupler 111 to the optical receiver 112 (step S11 in FIG. 6). The optical receiver 112 performs the O/E conversion on the control signal S0, and outputs the control signal S0 to the control unit 120 (step S12). The control unit 120 controls the optical transmission device 100, based on an instruction (control data) included in the control signal S0, and generates response data (step S13). After confirming the reception termination of the control signal S0, the control unit 120 outputs the response data to the response signal generation unit 140 (step S14). The response signal generation unit 140 controls the variable optical attenuator 141 according to response data, modulates light with a wavelength of the control signal S0 being extracted by the extraction unit 130, and generates the response signal S1 (step S15). The multiplexing unit 150 multiplexes the response signal S1 and the main signals S2 and S3, and outputs the response signal S1 and the main signals S2 and S3 to the optical transmission path 22 (step S16).

Figure 7:
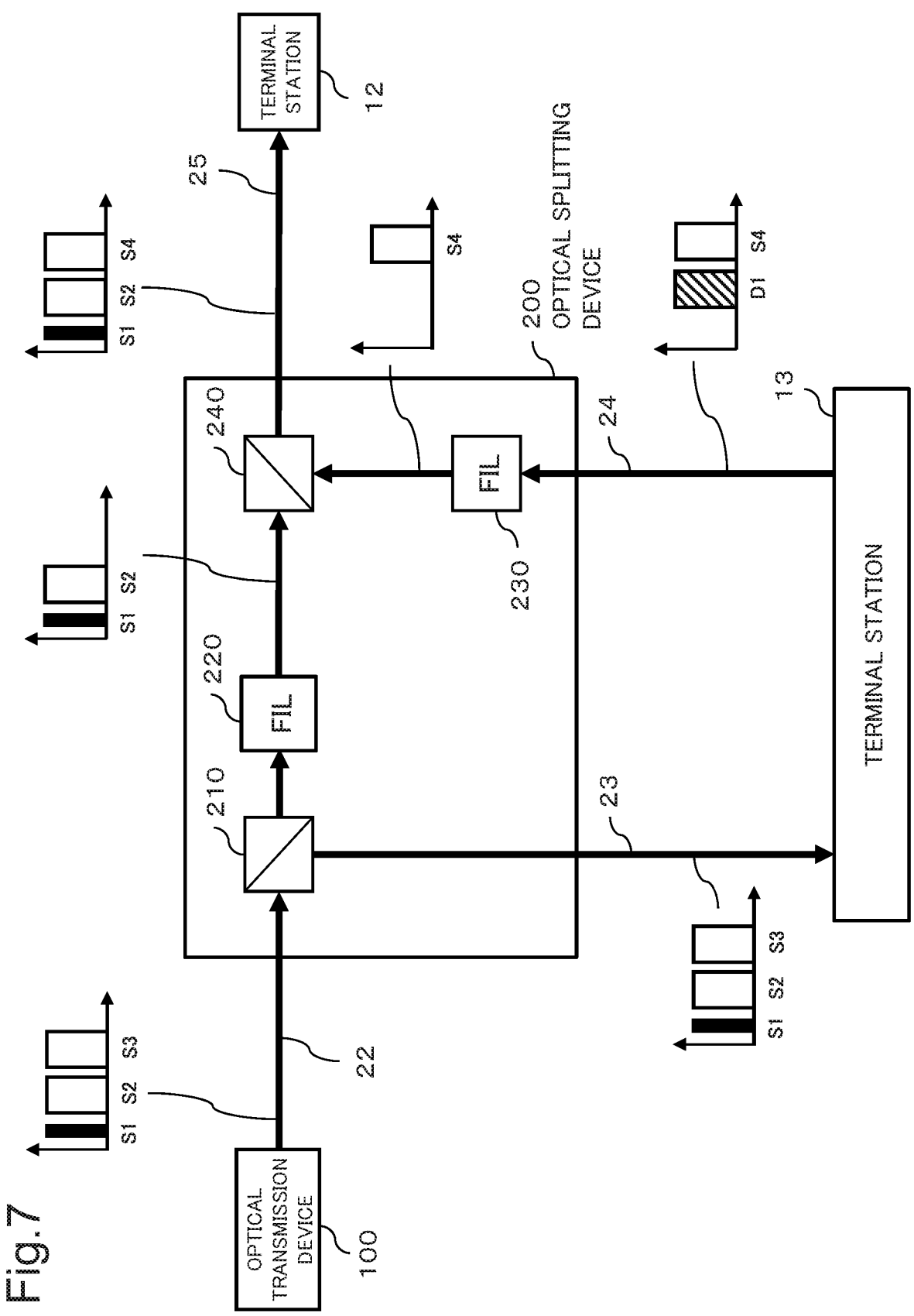
FIG. 7 is a block diagram illustrating a configuration example of an optical splitting device 200 according to the second example embodiment.
Figure 8:
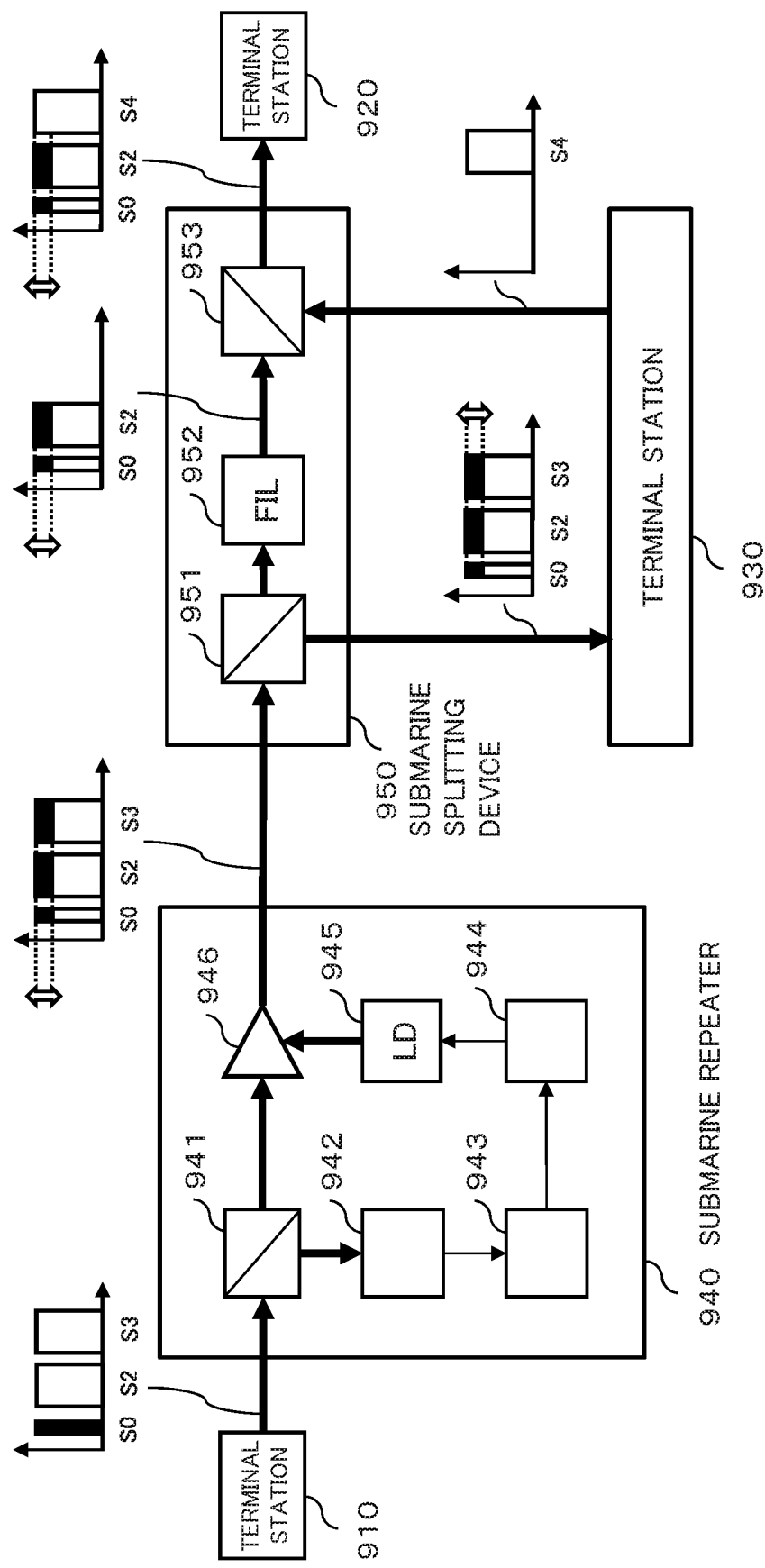
FIG. 8 is a block diagram illustrating a configuration of a general submarine optical transmission system 900.

FIG. 7 is a block diagram illustrating a configuration example of the optical splitting device 200 according to the second example embodiment. The optical coupler 210 splits the WDM signal output from the optical transmission device 100 to the optical transmission path 22, and outputs the WDM signals to the terminal station 13 and the optical filter 220. The optical filter 220 passes the wavelength range of the response signal S1 and the main signal S2, and blocks the wavelength range of the main signal S3. The optical filter 230 passes the wavelength range of the main signal S4, and blocks the wavelength range of the dummy signal D1. The optical coupler 240 generates the WDM signal by combining the response signal S1 and the main signal S2 that are transmitted from the optical transmission device 100 with the main signal S4 transmitted from the terminal station 13, and outputs the WDM signal to the optical transmission path 25. As the optical coupler 240, a wavelength filter that combines the response signal S1 and the main signal S2 with the main signal S4 may be used. With such a configuration, the optical splitting device 200 outputs, without any change, the response signal S1 received from the optical transmission device 100 to the terminal station 12.

The response signal S1 is controlled by ON/OFF, and thus has a high modulation degree. Thus, even when the control data of the response signal S1 are extracted from the optical power of the WDM signal at the terminal station 12, the extraction of the response signal S1 is facilitated as compared to when a drive current of the excitation LD is modulated and the control data are superimposed on the WDM signal with a low modulation degree.

In other words, in the optical transmission system 10 and the optical transmission device 100 according to the second example embodiment, the response signal generation unit 140 performs modulation of ON/OFF according to the control signal S0 only on a signal in a band being extracted by the extraction unit 130, and generates the response signal S1. As a result, a modulation degree of the response signal S1 can be increased, and thus a decrease in reception sensitivity to the response signal at the terminal station can be suppressed.

Note that the optical transmission system 10 according to the second example embodiment may include only the terminal station 11 (first terminal station), the terminal station 12 (second terminal station), and the optical transmission device 100, and the optical transmission path 22 connected to an output of the optical transmission device 100 may be directly connected to the terminal station 12. In such a configuration, an effect capable of suppressing a decrease in reception sensitivity to the response signal at the terminal station can also be acquired.

Modification Example of Second Example Embodiment

In the second example embodiment, the variable optical attenuator 141 is used in the response signal generation unit 140. However, another optical device capable of controlling an amount of attenuation with an electric signal may be used instead of the variable optical attenuator 141. For example, the response signal S1 may be generated by modulating CW light by using an optical modulator using an optical waveguide. Further, since the response signal S1 is an ON/OFF signal of light, an optical switch and an optical shutter capable of controlling passage and blockage of light with an electric signal may be used instead of the variable optical attenuator.

Further, the procedure according to the second example embodiment and a general procedure of superimposing a response signal on an amplitude of a WDM signal by control of a drive current of the drive circuit 114 (namely, control of excitation power of an excitation light source) may be used together. The control of the excitation power may be performed by the control unit 120. In this way, an amount of transmission of response data can be increased by transmitting different pieces of response data by different procedures. Alternatively, redundancy may be provided by transmitting the same response data by different procedures.

In the optical transmission system 10 according to the second example embodiment, a response signal is generated not by modulating the entire wavelength of a WDM signal but by modulating a specific wavelength band (band of the response signal S1). Thus, a response signal by modulation having a high extinction ratio can be generated. Further, a response signal generated by using the specific wavelength band can reach a terminal station that receives the response signal without being affected by Add/Drop by an adjacent optical splitting device. As described above, the optical transmission system 10 according to the second example embodiment can provide the optical transmission device capable of generating a response signal having high reception sensitivity.

The whole or part of the example embodiments disclosed above can be described as, but not limited to, the following supplementary notes.

(Supplementary Note 1)

An optical transmission device, including:

reception means for receiving a control signal including a predetermined instruction and a main signal, via an optical transmission path connected to a terminal station;

control means for performing the predetermined instruction of the received control signal;

extraction means for extracting light in a band of the control signal;

response signal generation means for modulating the extracted light in the band of the control signal, and outputting a response signal; and multiplexing means for multiplexing and outputting the response signal and the main signal, wherein the control means controls modulation by the response signal generation means according to the control signal.

(Supplementary Note 2)

The optical transmission device according to Supplementary Note 1, wherein the control means controls modulation by the response signal generation means, based on an execution result of the predetermined instruction.

(Supplementary Note 3)

The optical transmission device according to Supplementary Note 1 or 2, wherein the response signal generation means modulates the extracted light in the band of the control signal by on-off-keying.

(Supplementary Note 4)

The optical transmission device according to any one of Supplementary Notes 1 to 3, wherein the control means causes the response signal generation means to generate the response signal when the control signal including the predetermined instruction is not received in the reception means.

(Supplementary Note 5)

The optical transmission device according to Supplementary Note 4, wherein light in a band of the control signal is continuous light when the control signal does not include the predetermined instruction, and the response signal generation means generates the response signal by modulating the continuous light.

(Supplementary Note 6)

The optical transmission device according to any one of Supplementary Notes 1 to 5, further including an optical amplifier that amplifies the main signal by an excitation light source, wherein the control means controls excitation power of the excitation light source according to the control signal.

(Supplementary Note 7)

The optical transmission device according to any one of Supplementary Notes 1 to 6, wherein the response signal generation means modulates the extracted light in the band of the control signal by using any one of a variable optical attenuator, an optical modulator, an optical switch, and an optical shutter.

(Supplementary Note 8)

An optical transmission system, wherein a first terminal station that sends an optical signal including a control signal including the predetermined instruction and the main signal, the optical transmission device according to any one of Supplementary Notes 1 to 7 that receives the optical signal including the control signal including the predetermined instruction and the main signal from the first terminal station, and a second terminal station that receives the response signal are connected to one another with an optical transmission path.

(Supplementary Note 9)

An optical transmission method, including:

receiving a control signal including a predetermined instruction and a main signal, via an optical transmission path connected to a terminal station, and performing the predetermined instruction of the received control signal;

extracting light in a band of the control signal;

modulating the extracted light in the band of the control signal according to the control signal, and outputting a response signal; and multiplexing and outputting the response signal and the main signal.

(Supplementary Note 10)

The optical transmission method according to Supplementary Note 9, wherein the modulating the extracted band of the control signal is performed based on an execution result of the predetermined instruction.

(Supplementary Note 11)

The optical transmission method according to Supplementary Note 9 or 10, wherein the modulating the extracted light in the band of the control signal is performed by on-off-keying.

(Supplementary Note 12)

The optical transmission method according to any one of Supplementary Notes 9 to 11, wherein the response signal is generated when the control signal including the predetermined instruction is not received.

(Supplementary Note 13)

The optical transmission method according to Supplementary Note 12, wherein light in a band of the control signal is continuous light when the control signal does not include the predetermined instruction, and the optical transmission method further includes generating the response signal by modulating the continuous light.

(Supplementary Note 14)

The optical transmission method according to any one of Supplementary Notes 9 to 13, further including controlling excitation power of an excitation light source of an optical amplifier that amplifies the main signal according to the control signal.

(Supplementary Note 15)

A program of an optical transmission device causing a computer of the optical transmission device to perform:

a procedure of receiving a control signal including a predetermined instruction and a main signal, via an optical transmission path connected to a terminal station;

a procedure of performing the predetermined instruction of the received control signal;

a procedure of extracting light in a band of the control signal;

a procedure of modulating the extracted light in the band of the control signal according to the control signal, and outputting a response signal; and a procedure of multiplexing and outputting the response signal and the main signal.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. For example, the optical transmission system and the optical transmission device according to each of the example embodiments are applicable to both of a land optical transmission system and a submarine optical transmission system.

Further, the configuration described in each of the example embodiments is not necessarily exclusive. The action and effects of the present invention may be achieved by a configuration combining the whole or a part of the above-mentioned example embodiments.

This application is based upon and claims the benefit of priority from Japanese patent application No. 2017-207102, filed on Oct. 26, 2017, the disclosure of which is incorporated herein in its entirety by reference.

REFERENCE SIGNS LIST

10 Optical transmission system
11 to 13 Terminal station
21 to 25 Optical transmission path
100 Optical transmission device
110 Reception unit
111 Optical coupler
112 Optical receiver
113 Optical amplifier
114 Drive circuit
120 Control unit
121 Central processing unit
122 Memory
130 Extraction unit
131 Coupler
132 Optical filter
133 Optical filter
140 Response signal generation unit
141 Variable optical attenuator
150 Multiplexing unit
200 Optical splitting device 210, 240 Optical coupler
220, 230 Optical filter
900 Submarine optical transmission system
910, 920, 930 Terminal station
940 Submarine repeater
941, 951, 953 Optical coupler
942 Optical receiver
943 Control unit
944 Drive unit
946 Optical amplifier
950 Submarine splitting device
952 Optical filter

The invention claimed is:

1. An optical transmission device, comprising:
a receiver configured to receive a control signal including a predetermined instruction and a main signal, via an optical transmission path connected to a terminal station;
a controller configured to perform the predetermined instruction of the received control signal;
an extractor configured to extract light in a band of the control signal; a response signal generator configured to modulate the extracted light in the band of the control signal, and output a response signal; and
a multiplexer configured to multiplex and output the response signal and the main signal, wherein the controller controls modulation by the response signal generator according to the control signal, wherein
the receiver comprises a first optical coupler configured to split the control signal and the main signal into a first split light and a second split light each including the control signal and the main signal, and output, to the extractor, the first split light,
the controller performs the predetermined instruction in response to the control signal included in the second split light, and
the extractor comprises a second optical coupler configured to split the first split light input from the receiver into a third split light and a fourth split light each including the control signal and the main signal, a first optical filter configured to pass the main signal and block the control signal that are included in the third split light, and output the main signal to the multiplexer, and a second optical filter configured to pass the control signal and block the main signal that are included in the fourth split light, and output the control signal to the response signal generator.

2. The optical transmission device according to claim 1, wherein
the controller controls modulation by the response signal generator, based on an execution result of the predetermined instruction.

3. The optical transmission device according to claim 2, wherein
the response signal generator modulates the extracted light in the band of the control signal by on-off-keying.

4. The optical transmission device according to claim 2, wherein
the controller causes the response signal generator to generate the response signal when the control signal including the predetermined instruction is not received in the receiver.

5. The optical transmission device according to claim 4, wherein
light in a band of the control signal is continuous light when the control signal does not include the predetermined instruction, and the response signal generator generates the response signal by modulating the continuous light.

6. The optical transmission device according to claim 2, further comprising
an optical amplifier that amplifies the main signal by using an excitation light source, wherein
the controller controls excitation power of the excitation light source according to the control signal.

7. The optical transmission device according to claim 2, wherein
the response signal generator modulates the extracted light in the band of the control signal by using any one of a variable optical attenuator, an optical modulator, an optical switch, and an optical shutter.

8. An optical transmission system, wherein
a first terminal station that sends an optical signal including the control signal including the predetermined instruction and the main signal, the optical transmission device according to claim 2 that receives the optical signal including the control signal including the predetermined instruction and the main signal from the first terminal station, and
a second terminal station that receives the response signal are connected to one another with an optical transmission path.

9. The optical transmission device according to claim 1, wherein
the response signal generator modulates the extracted light in the band of the control signal by on-off-keying.

10. The optical transmission device according to claim 1, wherein
the controller causes the response signal generator to generate the response signal when the control signal including the predetermined instruction is not received in the receiver.

11. The optical transmission device according to claim 10, wherein
light in a band of the control signal is continuous light when the control signal does not include the predetermined instruction, and the response signal generator generates the response signal by modulating the continuous light.

12. The optical transmission device according to claim 1, wherein the receiver comprises
an optical amplifier that amplifies the first split light by using an excitation light source, wherein
the controller controls excitation power of the excitation light source according to the control signal.

13. The optical transmission device according to claim 1, wherein
the response signal generator modulates the extracted light in the band of the control signal by using any one of a variable optical attenuator, an optical modulator, an optical switch, and an optical shutter.

14. An optical transmission system, wherein
a first terminal station that sends an optical signal including the control signal including the predetermined instruction and the main signal, the optical transmission device according to claim 1 that receives the optical signal including the control signal including the predetermined instruction and the main signal from the first terminal station, and
a second terminal station that receives the response signal are connected to one another with an optical transmission path.

15. An optical transmission method, comprising:
receiving a control signal including a predetermined instruction and a main signal, via an optical transmission path connected to a terminal station, and performing the predetermined instruction of the received control signal;
extracting light in a band of the control signal;
modulating the extracted light in the band of the control signal according to the control signal, and outputting a response signal; and
multiplexing and outputting the response signal and the main signal, wherein
the receiving step comprises splitting the control signal and the main signal into a first split light and a second split light each including the control signal and the main signal,
wherein the predetermined instruction is performed in response to the control signal included in the second split light;
wherein the extracting step comprises splitting the first split light into a third split light and a fourth split light each including the control signal and the main signal, passing the main signal and blocking the control signal that are included in the third split light, and outputting the main signal included in the third split light for the multiplexing step, and passing the control signal and blocking the main signal that are included in the fourth split light, and outputting the control signal included in the fourth split light for the modulating step.

16. The optical transmission method according to claim 15, wherein
the modulating the extracted light in the band of the control signal is performed based on an execution result of the predetermined instruction.

17. The optical transmission method according to claim 15, wherein
the modulating the extracted light in the band of the control signal is performed by on-off-keying.

18. The optical transmission method according to claim 15, wherein
the response signal is generated when the control signal including the predetermined instruction is not received.

19. The optical transmission method according to claim 18, wherein
light in a band of the control signal is continuous light when the control signal does not include the predetermined instruction, and the optical transmission method further comprises generating the response signal by modulating the continuous light.

20. The optical transmission method according to claim 15, further comprising
controlling excitation power of an excitation light source of an optical amplifier that amplifies the main signal, according to the control signal.

* * * * *